United States Patent
Guerra et al.

(10) Patent No.: US 10,049,835 B2
(45) Date of Patent: Aug. 14, 2018

(54) STAGE CURTAIN MOTORIZED RIGGING LIMIT SWITCH

(71) Applicant: TEXAS SCENIC COMPANY, San Antonio, TX (US)

(72) Inventors: Joel A Guerra, San Antonio, TX (US); Nathan Dye, San Antonio, TX (US); Mason Scholl, San Antonio, TX (US)

( * ) Notice: Subject to any disclaimer, the term of this patent is extended or adjusted under 35 U.S.C. 154(b) by 0 days.

(21) Appl. No.: 15/424,500

(22) Filed: Feb. 3, 2017

(65) Prior Publication Data
US 2017/0221656 A1    Aug. 3, 2017

Related U.S. Application Data

(60) Provisional application No. 62/290,663, filed on Feb. 3, 2016.

(51) Int. Cl.
| H01H 21/34 | (2006.01) |
| A47H 5/00 | (2006.01) |
| H02P 3/06 | (2006.01) |

(52) U.S. Cl.
CPC .............. *H01H 21/34* (2013.01); *A47H 5/00* (2013.01); *H02P 3/06* (2013.01)

(58) Field of Classification Search
CPC ........... Y10T 74/18152; Y10T 74/1884; Y10T 409/305208; A47H 5/00; A47H 5/02; H01H 21/34; H02P 3/06
USPC ................ 200/47, 501, 33 R, 573; 74/25–37
See application file for complete search history.

(56) References Cited

U.S. PATENT DOCUMENTS

| 4,570,617 A * | 2/1986 | Baus ........................ A61H 7/00 188/65.1 |
| 4,666,026 A * | 5/1987 | Poulin ..................... E01F 13/06 192/141 |
| 2004/0099853 A1* | 5/2004 | Verakis ..................... B60P 3/34 254/343 |
| 2011/0179892 A1* | 7/2011 | Niioka ...................... F03G 7/10 74/25 |
| 2012/0292174 A1* | 11/2012 | Mah ........................ H01H 3/227 200/573 |
| 2013/0270092 A1* | 10/2013 | Kaneko ................. H02K 7/1853 200/501 |

* cited by examiner

*Primary Examiner* — Ahmed Saeed
(74) *Attorney, Agent, or Firm* — Jackson Walker LLP

(57) ABSTRACT

The limit switch uses a rolling sprocket mounted on an offset pivot point mounted in a housing in combination with inserts into individual links of the chain. The sprocket engages the chain using spring tension on the pivot point and rolls along the chain as the chain moves with the teeth of the sprocket inserting into the chain link spaces. An insert is attached in a chain link and positioned such that when the curtain reaches the desired terminal position, the inserts are at the point where the sprocket contact the insert. The insert blocks the cog of the sprocket which pushes the sprocket away from the chain and inwardly into the interior of the housing. Inside the housing the limit switch that is activated—either by contact or other means. The activation of the kill switch stops the motor and thus the movement of the curtains.

4 Claims, 5 Drawing Sheets

STAGE CURTAIN MOTORIZED RIGGING LIMIT SWITCH

This application is based upon and claims priority from U.S. Provisional application Ser. No. 62/290,663, which is incorporated herein by reference.

BACKGROUND OF THE INVENTION

Field of the Invention

Applicants' invention relates to a device for shutting off motorized rigging. More particularly, it relates to a limit switch that confines the motion of a stage curtain to a predetermined position by deactivating the motor that drives the rigging.

Background Information

Theater drapes and stage curtains are large pieces of cloth that are designed to mask backstage areas of a theater from spectators or change acoustic values of a room. They are designed for a variety of specific purposes and come in several types.

There are several parts typically used in the curtain assemblies, generally including:

Cable Drum: Helically grooved drums that neatly wrap the cable lifting battens. Multiple drums may be used, and supported by a line shaft assembly. They are spaced to properly support the batten or load.

Chain Track: Chain and supported track combination used to move curtains or scenery.

Computerized Control Systems: Control systems that allow precise position of battens for each scene. They can also track speed, height, and travel of the battens, allowing the changes between scenes to be recorded into memory, and repeated in the exactly the same manner.

Drum Winches: Motorized winch with a single drum long enough to accommodate all of the lift lines required to support a batten. The helically grooved drum wraps the cable neatly in a single layer, to avoid damage to the cable and to keep all lines lifting equally. Winches can be located on the grid, catwalks, or in a separate motor platform. Head and loft blocks may be used to direct the lift lines to the batten.

Gear Motor: The combined gearbox, motor and brake provide speed reduction, power, and mechanical braking in the smallest space.

Limit Switch: Rotary switch geared to rotation of the shaft of the motor. When the switch turns to the appointed spot, it cuts power to the motor. Limit switches can have a number of positions to allow for high trim, low trim, or over travel.

Line Shaft Winch: An assembly consisting of the gear motor, and cable drums connected with a steel shaft. Each lift line uses a separate cable drum. The entire load is transferred through the winch frame assembly to the structure, eliminating horizontal loads, and the need for head blocks and loft blocks. The line shaft winch is ideal for situations where there is not much space nor structure to accommodate the horizontal loads.

Manual Controls: Simple push button controls to allow visual positioning of battens with motorized systems. All buttons release when they are not being pushed. All controls include an emergency stop that kills power to the motors.

Point Hoists: When great flexibility is required, a set of spot lines, or point hoists work together to support and operate a batten or load. Small portable point hoists can be attached to a grid. Larger units can be used with loft blocks to position the lift line appropriately.

The rigging assemblies also have several standard components, generally including:

Batten: A metal pipe, generally 1½" in diameter attached to the onstage lines from a rigging system. Scenery, draperies, or lighting equipment is attached to the batten.

Counterweight Arbor: A metal carriage that holds the counterbalancing weights used in a counterweight rigging system.

Counterweight Arbor Guides: A device that attaches to a counterweight arbor and engages the guide rails to control the movement of the arbor. Guides employ low friction sliding materials or roller elements. Arbors are generally guided by a fixed (Tee-Bar or JBar) guides, but can also be guided with wire rope.

Hand Line: The rope pulled by the rigging operator to raise and lower the counterweight rigging battens.

Headblock: A multisheave block with two or more pulley wheels, used to change the direction of all the cables that support the batten. It is located directly above the arbor, pin rail, or hoist.

Lift Lines: Cables or ropes attached to the counterweight arbor at the offstage end, reeved through head blocks, and loft blocks and are terminated to the batten or load over the stage.

Loading Bridge: A catwalk or walkway that is suspended just below the grid where the counterweights are loaded onto or removed off from the arbor.

Loft Block: A grooved pulley mounted on top of the grid, used to change the direction in which the cable travels from the head block to the batten.

Mule Block: A grooved pulley mounted on top of the grid, used to redirect the lift line in another direction.

Outrigger Batten: A batten mounted in a fixed position to support locking rail work lights and protect the counterweight rigging equipment from contact with scenic elements.

Rope Lock: A positioning device, located on the locking rail, which grips or releases the hand line of a counterweight set.

Tension/Floor Block: A grooved pulley mounted at the floor level of the counterweight set. The floor block removes slack from the hand line and prevents it from twisting in its travel.

Trim Chain: Short chain used to attach the lift lines to the battens. The chain is attached to the lift line, wraps around the batten, and then is attached back to itself or the lift line with a shackle.

The curtains are hung from battens or tracks. Often, it is desirable to have the curtains move outwardly along the battens. Heavyweight velour is the current industry standard for these types of curtains. Due to the heavyweight material and the size of the curtains, they tend to be extremely heavy. In order to move the curtains, they are generally hung on a chain or cable suspended by pulleys, while the chain is moved by an electric motor. The chain moves in a circuit so at the terminal ends it generally takes a tight turn about a terminal sprocket or pulley and then follows the batten back along the track of the curtain. It can be extremely important that the curtain stop before getting into a position that causes excessive torque on the motor and damage to the motor, curtains, battens, or chains. Therefore, it's important that the curtain motor to have a stop system that limits movement of the curtains at a desired or necessary point. Likewise, there may be a point at which the users wish the curtains to be stopped for use, aesthetic, or other purposes.

Stopping the massive theater drapes has generally been done using a limit switch with a rotational counter, a limit switch that the curtain contacts to activate, or simply a person as a spotter to hit a stop button.

SUMMARY OF THE INVENTION

The present invention is a new design of a kill switch for stopping the motor on a stage curtains rigging system.

The present invention uses a rolling sprocket mounted on an offset pivot point mounted in a housing in combination with inserts into individual links of the chain. The sprocket engages the chain using spring tension on the pivot point and rolls along the chain as the chain moves with the teeth of the sprocket inserting into the chain link spaces. Users place the inserts into the chain links and position them such that when the curtain reaches the desired terminal position that inserts are at the point where the rolling sprocket is engaging the chain. When the sprocket contact the inserts, the teeth of the sprocket are not allowed to engage into the interstitial portion of the chain links. Thus, the sprocket is pushed on the offset pivot against the spring tension and inwardly into the interior of the housing. Inside the housing is a kill switch that is activated upon the inward movement of the sprocket—either by contact or other means. The activation of the kill switch stops the motor and thus the movement of the curtains.

This works particularly well when the chain is a double chain. When a double chain is used, the track pulleys and motor engage with a first row of chain links while the curtain is hung from a second row of chain links. It is generally intended that the inserts and rolling sprocket will engage with the second row of chain links such that the track pulleys and motor will not damage or contact the inserts.

Because of the weight of the curtains and the resulting momentum, the chain and curtains may continue to move for a short distance after the kill switch is activated upon the contact sprocket with the inserts. It is conceivable that, after the insert has passed the sprocket, that the kill switch would be deactivated and the motor restarted starting movement of the curtains forward again and possibly causing damage. Therefore, it may be advantageous to have multiple inserts such that the sprocket and consequently the kill switch remains in the activated position long enough for the curtain to come to a complete stop.

DETAILED DESCRIPTION OF THE PREFERRED EMBODIMENT

Referring to the figures, references are labeled as:

| | |
|---|---|
| 10 | Limit Switch |
| 12 | Housing |
| 12a | Housing End |
| 12b | Housing Side |
| 12c | Housing Bottom |
| 14 | Sprocket |
| 16 | Cog |
| 18 | Sprocket Aperture |
| 20 | Sprocket Connector |
| 22 | Sprocket Axle |
| 24 | Swingarm |
| 24a | Swingarm Sprocket End |
| 24b | Swingarm Attachment End |
| 24c | Swingarm Midportion |
| 26 | Swingarm Axle |
| 28 | Swingarm Connector |
| 30 | Attachment Aperture |
| 32 | Switch |
| 34 | Spring |
| 36 | Spring Attachment Point |
| 38 | Switch Actuator |
| 40 | Spring Base |
| 42 | Switch Connector |
| 44 | Contacts |
| 46 | Insert |
| 48 | Insert Connector |
| 50 | Double Chain |
| 50a | Drive Chain |
| 50b | Hanging Chain |
| 52 | Track |
| 54 | Pulley |
| 56 | Sprocket Assembly |
| 58 | Bearing |
| 60 | Insert |
| 62 | Insert Back |
| 64 | Finger |
| 66 | Pocket |
| 68 | Shoulder |
| 70 | Flex Slot |
| 72 | Terminal Pulley |

Figure 1:
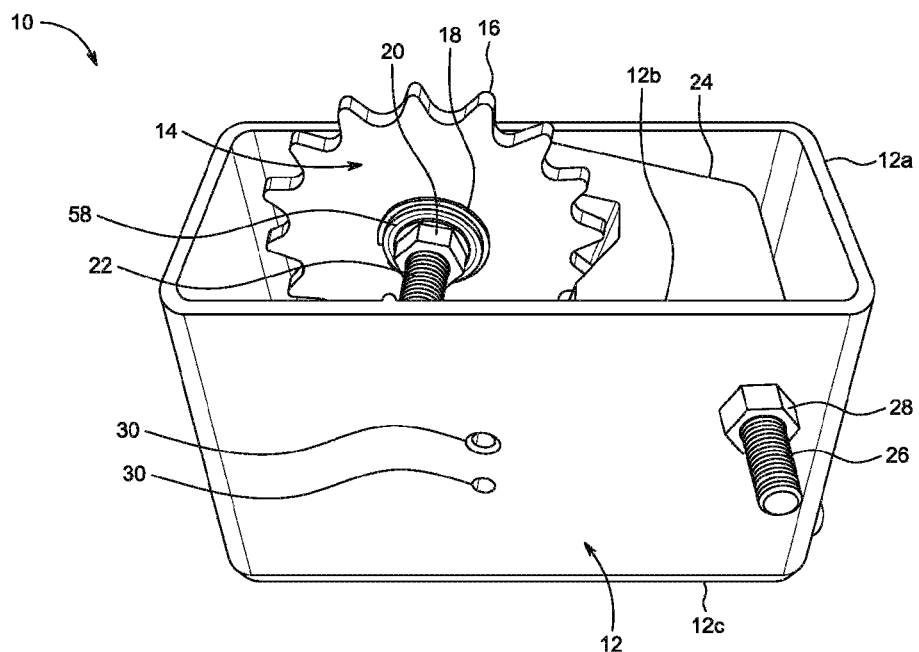
FIG. 1 is a perspective view of the limit switch.

FIG. 1 illustrates the limit switch 10. The limit switch 10 has a housing 12 with a hollow interior. It is generally anticipated that the housing 12 will be rectangular in shape with two housing ends 12a, two housing sides 12b, a housing bottom 12c, and an open side opposite the housing bottom 12c. Attached to the housing, generally near one of the housing ends 12a, is a swingarm axle 26. The swingarm axle 26 may be connected to the housing 12 by a swingarm connector 28 or by other means such as welding, adhesive, or friction. A swingarm 24 is rotatably connected to the swingarm axle 26 at the swingarm's 24 swingarm attachment end 24b. The swingarm attachment end 24b has an aperture through which the swingarm axle 26 is inserted. This allows the remainder of the swingarm 24 to rotate in and out of the interior of the housing 12.

At the swingarm sprocket end 24a, a sprocket axle 22 is attached. A sprocket 14 having a centrally located aperture 18 is rotatably connected to the sprocket axle 22 such that the sprocket 14 rotates about the sprocket axle 22. Thus, the rotatable sprocket 14 is in mechanical cooperation with the sprocket assembly 56. The sprocket assembly 56 is comprised of the swingarm 24, the sprocket axle 22, the sprocket 14, and other parts attached to said swingarm 24. The rotatable sprocket 14 is offset from the rotational point of the swingarm 24. It is anticipated that the sprocket 14 will be attached on the sprocket axle 22 by a sprocket connector 20. The swingarm 24 acts as a hinged lever. The swingarm attachment end 24b rotates about the swingarm axle 26 like a lever. The amount of plunger 38 movement is increased at the end of the lever 24a by the lever ratio. The swingarm axle 26 acts as a fulcrum about which the swingarm 24 rotates.

It is anticipated that the sprocket 14 may simply have an aperture in its center through which the sprocket axle 22 is inserted, or a bearing 58 may be inserted between the axle 22 an the sprocket 14 in order to ease rotation and reduce friction and wear of the sprocket 14. Likewise, a bearing 58 may be inserted between the swingarm attachment end 24b aperture and the swingarm axle 26 also to ease rotation and reduce friction and wear of the swingarm 24.

The housing 12 may have attachment apertures 30 through any portion of the housing 12. Connectors may be inserted through the housing apertures 30 so that the limit switch 10 may be connected to a track 52 or adjacent to a track 52.

Figure 2:
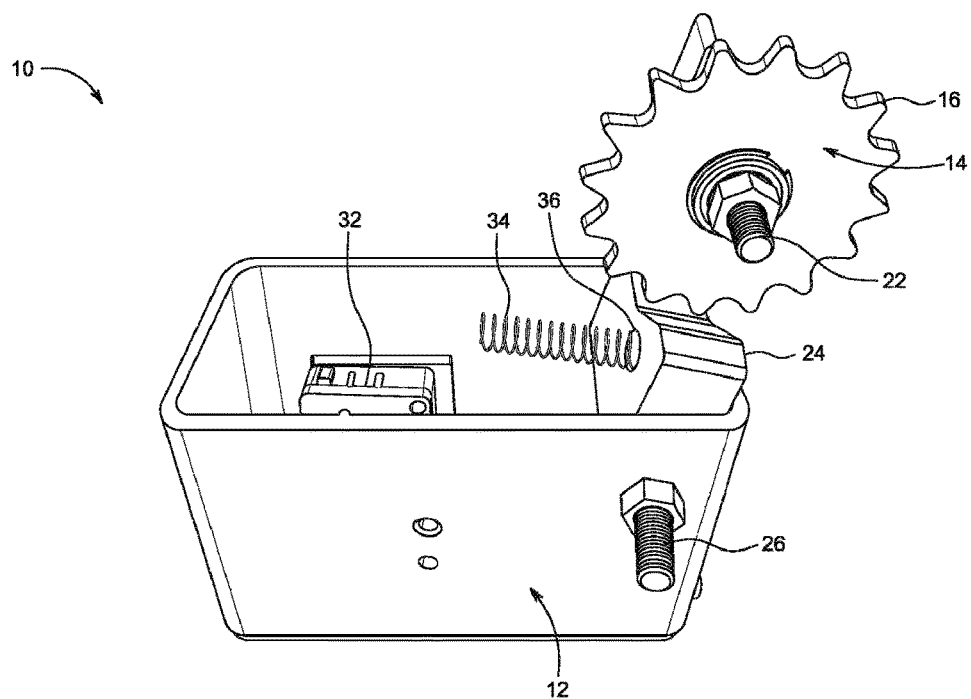
FIG. 2 is a perspective view of the limit switch with sprocket extended.

FIG. 2 illustrates the limit switch 10 with sprocket 14 extended. This figure shows the limiting switch housing 12 with the rotatable sprocket 14 attached to the centered sprocket axle 22. The sprocket 14 rotates about the sprocket axle 22. The sprocket assembly 56 rotates at the swingarm attachment end 24b on the offset pivot, swingarm axle 26. In use, the rotation of the swingarm assembly 56 would be minimal. The movement being from a position wherein the cogs 16 are engaging with and inserting into the chain 50 to a position where the apex of the cog 16 is abutted against an insert 60. Tension spring 34 is attached to the swingarm 24 at the spring attachment point 36. Inside the housing 12 is the switch 32.

Figure 3:
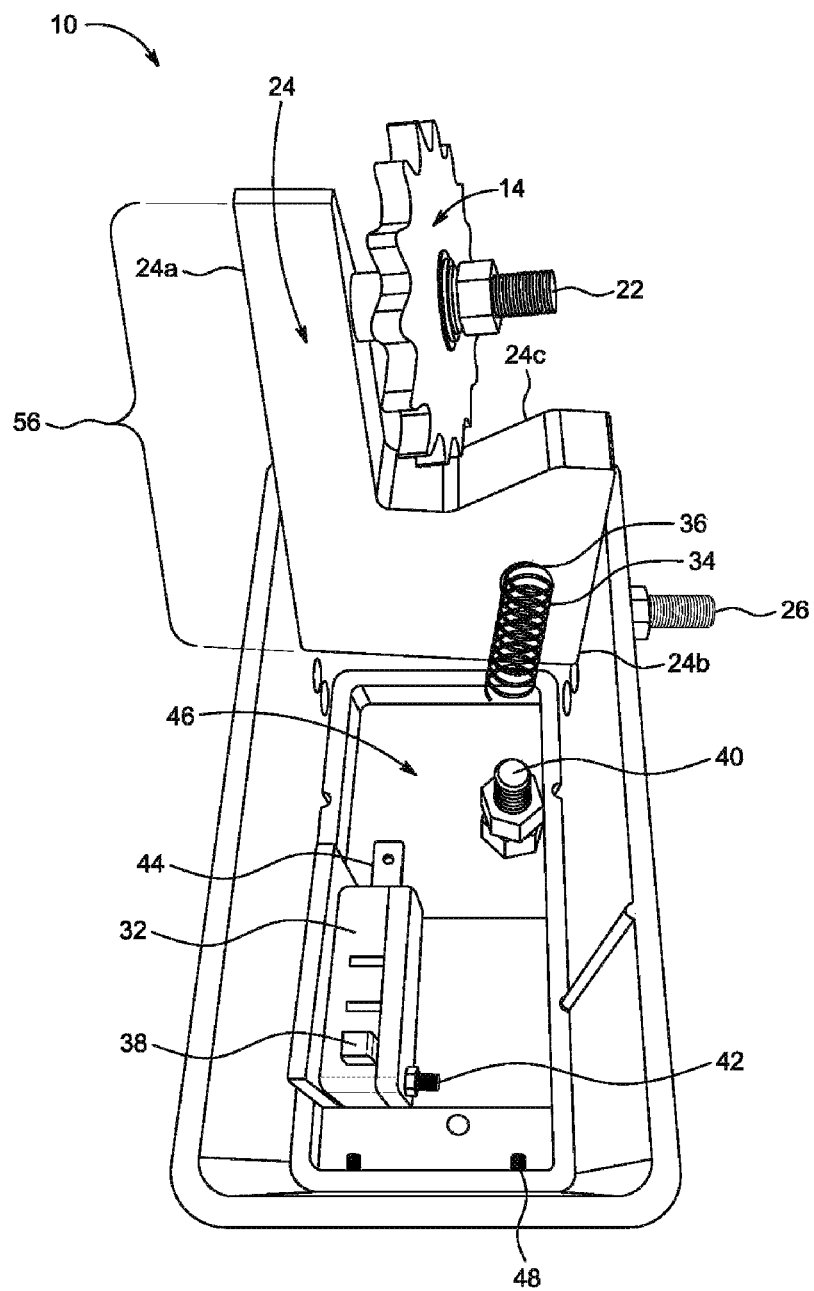
FIG. 3 is a perspective view of the interior of the limit switch housing with rotatable sprocket.

FIG. 3 illustrates the interior of the limit switch housing 12 with rotatable sprocket 14. This figure shows the interior of the limiting switch housing 12 with the sprocket 14 assembly pivoted out on the offset pivot, swingarm axle 26. When the sprocket 14 assembly is in its working position, the tension spring 34 engages the swingarm 24 at the spring attachment point 36 to urge the sprocket 14 against the chain 50. Inside the housing 12 is spring base 40. The end of spring 34 opposite the spring attachment point 36 urges against the spring base 40.

The swingarm 24 is a fulcrum that pivots about swingarm axle 26. The swingarm axle 26 will generally be attached to the housing 12, however it could be secured with in the housing 12 without being directly attached to the housing 12. It is anticipated that the sprocket 14 and swingarm 24 will comprise a sprocket assembly 56. The sprocket assembly 56 rotates about the swingarm axle 26 and the sprocket 14 is engaged with the chain 50. In a first embodiment the swingarm 24 is sized at its widest to substantially fill the width of the interior of the housing 12 with enough space between the swingarm 24 and the interior of the housing 12 so that the swingarm 24 is movable within the housing 12. In this first embodiment, the swingarm 24 would have a narrowed swingarm midportion 24c and swingarm sprocket end 24a. The narrowing of this portion of the swingarm 24 allows the sprocket axle 22 to be inserted through the sprocket aperture 18 and the sprocket 14 to be rotatably connected to the sprocket axle 24 in the interior of the housing 12 such that the sprocket assembly 56 is still movably rotatable inside the interior of the housing 12. It is anticipated that in separate embodiments, the swingarm 24 may be narrowed throughout its entire length such that the sprocket axle 22 may be inserted through the sprocket aperture 18 and the sprocket 14 to be rotatably connected to the sprocket axle 24 in the interior of the housing 12 such that the sprocket assembly 56 is still movably rotatable inside the interior of the housing 12.

Also shown in this figure is the switch 32 attached via a switch connector 42. The swingarm sprocket end 24a acts as a "dog," and is used to activate the switch actuator 38. The swingarm sprocket end 24a may be thus swingarm 24 in itself, a cam, or an object attached to the swingarm 24 that is able to contact the switch actuator 38. When the sprocket 14 engages the chain inserts 60 the sprocket assembly is pushed inwardly and activates the switch 32 which is in operative communication with the curtain motor (not shown), and when the switch actuator 38 is depressed, the switch 32 sends a signal that turns off the curtain motor (not shown). It is anticipated that the signal will be via electrical communication from the switch 32 and communicated via contacts 44 to a wire (not shown) that is connected either directly or indirectly to the curtain motor (not shown).

It is anticipated that the switch actuator 38 will be a plunger type such that when the cogs 16 engage the inserts 60 rather than inserting into the chain 50 interstitial spaces, the swingarm 24 is moved inwardly into the housing 12 and the swingarm sprocket end 24a pushes the switch actuator 38 so that it depresses—activating the switch 32 and turning off the curtain motor (not shown). When the sprocket cogs 16 are engaged with the chain 50 and not urged against an insert 60 then the spring 34 acts to insert the cogs 16 into the chain and away from the switch actuator 38. When the swingarm 24 is not urged against the switch activator 38, the switch activator 38 resets and the curtain motor (not shown) may be turned on and drive movement of the curtain (not shown). It is anticipated that there may be various types of switches 32 and switch actuators 38. For example, the switch actuator 38 may be a plunger type or contact type wherein the swingarm 24 completes an electrical circuit in the switch 32.

Attached at or near the housing bottom 12c in the interior of the housing 12 may be an insert 46 within which the switch 32 may be connected via an insert connectors 48. It is anticipated that the insert 46 may be insulated in order to electrically isolate the switch 32 from the housing 12.

Figure 4A:
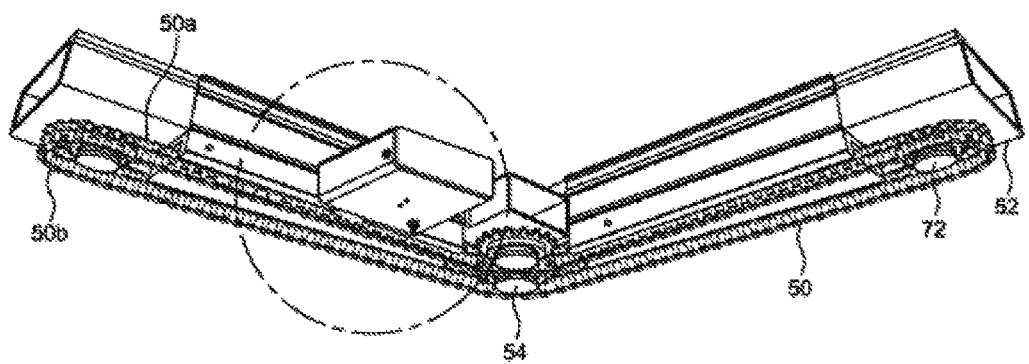
FIG. 4a is a perspective view of the double chain with inserts and limit switch and sprocket positioned on the chain.
Figure 4B:
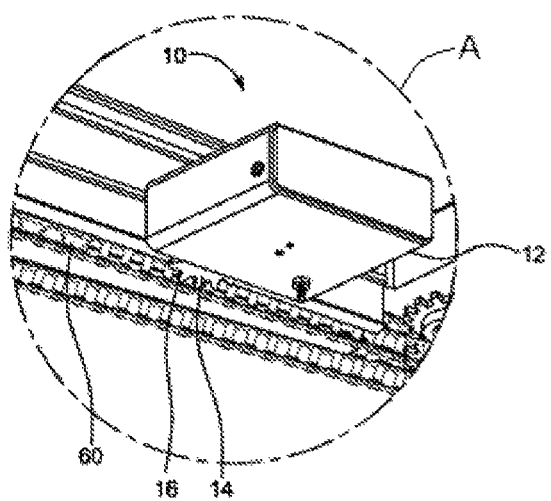
FIG. 4b is a detail view of the double chain with inserts and limit switch from FIG. 4a circle A.

FIGS. 4a and 4b illustrate the inserts 60, limit switch 10, and sprocket 14 positioned in mechanical communication with a chain 50. These figures illustrate a portion of a curtain track 52 with pulleys 54, terminal pulleys 72, and a double chain 50. The track pulleys 54 and 72 and curtain motor (not shown) engage the double chain 50 on its first row, or drive chain, 50a of links. The curtains (not shown) are hung from the second row, or hanging chain, 50b of links. Inserts 60 are placed in the interstitial space between links of the second row 50b of the chain 50 at a position where the user wishes movement of the curtain (not shown) to always be stopped. The limiting switch 10 is shown in place with the sprocket 14 engaged with the second row 50b of the chain 50. Depending upon the configuration of the track 52, the limit switch 10 may be positioned using the attachment apertures 30 and connectors in a variety of positions or orientations. It is anticipated that a single row chain 50 could be used with the limit switch 10 and inserts 60, the majority of chains 50 used in the industry are double rowed.

Figure 5:
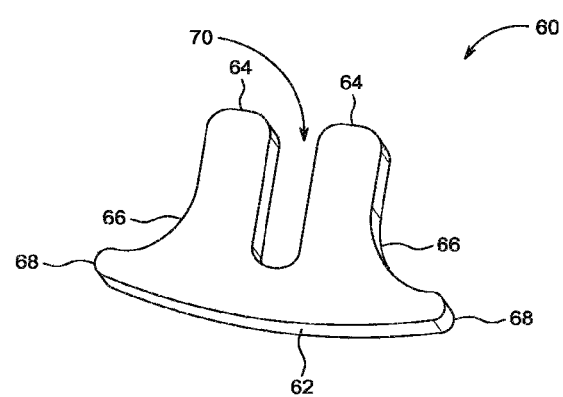
FIG. 5 is a perspective view of an insert.

FIG. 5 illustrates an insert 60. The insert 60 is shaped and sized to be inserted and held in the interstitial space of a chain 50 link. In a first embodiment of the insert 60, the insert 60 has two or more fingers 64 that insert into the chain 50 link interstitial space. The multiplicity of fingers 64 creates a flex slot 70. The flex slot 70 allows the fingers 64 to slightly flex inwardly while the elasticity of the insert 60 causes the fingers 60 to resist the distorting influence or stress and to return to its original shape. This elasticity causes the fingers 64 to continually urge themselves against the chain 50 links. It is further anticipated that the pockets 66 of the fingers 64 that are urged against the chain 50 links will be shaped to be complementary with the shape of the chain 50 links. Shoulders 68 of the insert 60 will extend outwardly from the chain 50 links and are connected by an insert back 62 which is designed to contact the cogs 16. When the cogs 16 come in contact with the insert back 62, the cogs 16 are not able to insert into the interstitial space of a chain 50 link because it is filled with the insert 60. Thus, the sprocket 14 is pushed away from the chain 50 and inwardly to the interior of the housing 12 against the resistance of the spring 34 and causing the swingarm 24 to contact and activate the switch actuator 38, which in turn communicates with the curtain motor to deactivate and stop movement of the curtains.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A limit switch apparatus for stopping a motor on a stage curtains rigging system having a chain, comprising:
   a swingarm axle;
   wherein said swingarm axle is located in close proximity to said chain;
   a swingarm, said swingarm having a midportion between a sprocket end and an attachment end;
   wherein said swingarm's attachment end is rotatably attached to said swingarm axle;
   a sprocket, said sprocket having a multiplicity of cogs;
   wherein said sprocket is rotatably attached to said swingarm sprocket end;
   a switch, wherein said switch is located in close proximity to said swingarm;
   said switch having an actuator, wherein said switch is in operative communication with said motor, and wherein when said switch is activated it causes said motor to deactivate and when said switch is deactivated it causes said motor to activate;
   a spring;
   wherein said spring is urged against said swingarm such that said swingarm tends to rotate, and wherein such rotation tends to engage said cogs of said sprocket with said chain, and further wherein such rotation tends to move said swingarm away from said switch such that said switch is deactivated;
   wherein when said motor is activated and causing said chain to move, such chain movement causes said sprocket to rotate;
   an insert attached to said chain; and
   wherein when a cog contacts said insert, said sprocket is urged away from said chain and against said switch causing said switch to activate and said motor to deactivate.

2. The apparatus of claim 1, further comprising:
   a housing, said housing having a hollow interior;
   said swingarm axle attached inside said housing;
   said switch attached inside said housing; and
   said housing attached near said chain.

3. A limit switch apparatus for stopping a motor on a stage curtains rigging system having a chain, comprising:
   a housing, said housing having a hollow interior, and said housing attached adjacent to said chain;
   a sprocket assembly, said sprocket assembly comprised of a swingarm, a sprocket axle, and a sprocket, wherein said swingarm is rotatable about said sprocket axle and said sprocket is rotatably attached to said swingarm;
   wherein said sprocket axle is attached in said housing interior such that said sprocket can rotate inwardly and outwardly from said housing;
   a spring base attached inside said housing;
   a spring positioned between said spring base and said swingarm so as to push said swingarm outwardly from said housing to a first position such that said sprocket will engage said chain;
   a switch, wherein when said switch is activated it causes said motor to deactivate and when said switch is deactivated it allows said motor to be activated;
   wherein when said swingarm is in said first position, said switch is deactivated;
   wherein said switch is attached in said housing interior near said swingarm such that if said swingarm is rotated inwardly to a second position, said swingarm will activate said switch causing said motor to deactivate;
   wherein said switch is in operative communication with said motor;
   an insert attached to said chain; and
   wherein when said sprocket contacts said insert, said sprocket is urged away from said chain to said second position.

4. A limit switch apparatus for stopping a motor on a stage curtains rigging system having a chain with a multiplicity of chain link spaces, comprising:
   a rolling sprocket mounted on an offset pivot point mounted in a housing;
   an insert mounted into at least one of said multiplicity of chain link spaces of said chain;
   wherein said rolling sprocket engages said chain with a tooth of said rolling sprocket inserting into a chain link space;
   wherein said rolling sprocket rotates along said chain as said chain moves;
   wherein said insert positioned such that when said chain reaches a desired terminal position, said insert is positioned where said tooth contacts said insert, and said insert blocks said tooth from inserting into said one of said multiplicity of chain link spaces of said chain;
   wherein said insert pushes said sprocket away from said chain and moves said sprocket inwardly into said housing;
   wherein said inward movement of said sprocket causes a limit switch attached in said housing and in operative communication with said motor to become activated; and
   wherein said activation of said limit switch causes said motor to stop moving said chain.

* * * * *